United States Patent [19]

Schirmer

[11] Patent Number: 4,853,287
[45] Date of Patent: Aug. 1, 1989

[54] HIGHLY FORMABLE LAMINATES

[75] Inventor: Henry G. Schirmer, Spartanburg, S.C.

[73] Assignee: W. R. Grace & Co., Duncan, S.C.

[21] Appl. No.: 109,900

[22] Filed: Oct. 19, 1987

[51] Int. Cl.⁴ .............................................. C09J 7/02
[52] U.S. Cl. ................................. 428/349; 428/36.7; 428/518; 428/520; 428/913
[58] Field of Search ............... 428/349, 913, 518, 520, 428/522

[56] References Cited

U.S. PATENT DOCUMENTS

| | | | |
|---|---|---|---|
| Re. 30,009 | 5/1979 | Perdue | 53/433 |
| 3,835,618 | 9/1974 | Perdue | 53/112 |
| 3,950,919 | 4/1976 | Perdue | 53/22 |
| 3,966,045 | 6/1976 | Perdue | 206/443 |
| 4,048,428 | 9/1977 | Baird, Jr. et al. | 428/51 J |
| 4,382,513 | 5/1983 | Schirmer | 206/484 |
| 4,400,428 | 8/1983 | Rosenthal et al. | 428/349 |
| 4,421,823 | 12/1983 | Theisen et al. | 428/349 |
| 4,542,075 | 9/1985 | Schirmer | 428/518 |
| 4,561,920 | 12/1985 | Foster | 428/349 |
| 4,755,419 | 7/1988 | Shah | 428/349 |

Primary Examiner—Edith Buffalow
Attorney, Agent, or Firm—John J. Toney; William D. Lee, Jr.; Mark B. Quatt

[57] ABSTRACT

A laminate useful in thermoforming and VSP processes comprises a surface film, barrier film, and sealant film bonded together by, for example, corona bonding. At least one of the films comprises a hot blown high molecular weight polymeric material. Preferably, at least one of the films is cross-linked by irradiation or chemical cross-linking.

11 Claims, 2 Drawing Sheets

HIGHLY FORMABLE LAMINATES

BACKGROUND OF THE INVENTION

The present invention relates to laminates, and more particularly laminates having good formability in processes such as thermoforming and vacuum skin packaging.

It is common practice to package articles such as food products in thermoplastic films or laminates to protect the product to be packaged from abuse and exterior contamination, and to provide a convenient and durable package for transportation and ultimate sale to an end user.

Thermoforming and other similar techniques are well known in the art for packaging food products. Suitable thermoforming methods, for example, include a vacuum forming or plug-assist vacuum forming method. In a vacuum forming method, the first web is heated, for example by a contact heater, and a vacuum is applied beneath the web causing the web to be pushed by atmospheric pressure down into a preformed mold. In a plug-assist vacuum forming method, after the first or forming web has been heated and sealed across a mold cavity, a plug shape similar to the mold shape impinges on the forming web and, upon the application of vacuum, the forming web transfers to the mold surface.

After the forming web is in place, a product is placed, such as by manual loading, on the forming web and a second substantially non-forming web is disposed over the product. The package is vacuumized and fusion sealed with a sealing device such as a heated jaw. The first or forming web encloses a substantial portion, generally more than half, of the product to be packaged.

Thermoforming is a popular method of packaging meat products such as smoked and processed meats. In packaging such products, it is desirable to provide a clear package with good optical properties such as clarity and gloss in order to enhance package appearance for the consumer.

Color retention of the product, particularly in the case of meat products, and extended shelf life are also advantageous features. Finally, it is desirable to provide a packaging material which, after the thermoforming operation, will maintain a tight package appearance commonly known in the art as good memory characteristics.

A description of typical thermoforming techniques currently available in the art appears in *Modern Plastics Encyclopedia*, 1984-1985, at pages 329-336.

Vacuum skin packaging (VSP) is another process well known in the art for using a thermoplastic packaging material to enclose a product such as meat. Various apparatus and processes are described in U.S. Pat. Nos. 3,835,618, 3,950,919, and Re. 30,009, all issued to Perdue. Cross linked polyolefin materials useful in VSP applications, and providing readily peelable seals, are described in U.S. Pat. No. 4,382,513 issued to Schirmer et al. The vacuum skin packaging process is in one sense a type of thermoforming process in which an article to be packaged serves as the mold for the forming web. An article may be placed on a support member, a card, either rigid or semi-rigid, or other bottom web, and the supported article is then passed to a chamber where a top web is drawn upward against a heated dome and the softened top web is then draped over the article. The movement of the web is controlled by vacuum and or air pressure, and in a vacuum skin packaging arrangement, the interior of the container is vacuumized before final welding of the top web to the support web. Formable material may be used as both top and bottom webbing in conjunction with an intermediate support for products held on either side of the support as shown for example in U.S. Pat. No. 3,966,045.

One common requirement of the forming web in thermoforming processes, and a skin packaging material in VSP processes, is the requirement of some degree of formability of the material. A common and recurrent problem in such operations is the occurrence of wrinkles, line draw and other irregularities in the final packaged product. In VSP applications, wrinkles can occur especially at lower temperatures, and efforts have been made to reduce wrinkles in the final package by means of higher forming temperatures.

Thus, in a VSP application, the dome temperature i.e. the temperature of the top of the chamber to which a VSP film is drawn and heated for softening, is raised to for example 190° to 270° C. range.

Some improvement in providing a wrinkle-free package may be obtained by this solution, but it is not without other complications. For example, it is obviously more expensive to run a piece of equipment at the elevated temperature needed to reduce wrinkles. The package produced at the elevated temperatures may not be as aesthetically pleasing as one produced at lower temperatures, for example in the case of hard chilled meat, where the preferred rigid tabular appearance of the meat cut may be softened or distorted by exposure to the elevated temperatures. In cases where the elevated temperatures are required by the properties of the constituent resins of the packaging material, it may be impractical or impossible to operate at significantly lower temperatures and still produce a suitable package.

It is therefore an object of the present invention, to provide a film useful in forming processes such as vacuum skin packaging or thermoforming, where relatively low temperatures may be utilized in heating the material.

It is an additional object of the present invention to provide a film which will result in no line draw in thermoforming or reduced wrinkles in a VSP operation. Line draw is used herein to describe an undesirable characteristic of a thermoplastic crystalline material which has been produced with either substantially no orientation, or orientation principally in one direction only, usually the machine direction. Upon subsequent thermoforming mold configuration. In the unoriented direction, the material will elongate at the yield point, resulting in elongated tapered streaks aligned in the oriented direction.

It is an additional object of the present invention to provide a packaging film incorporating an oxygen barrier material which may be formed at relative low temperatures.

SUMMARY OF THE INVENTION

In one aspect of the present invention, a thermoplastic laminate comprises a first film disposed as one surface of the laminate, comprising an abuse-resistant polymeric material; a second film comprising an oxygen barrier polymeric material; and a third film, disposed as another surface of the laminate, comprising a heat sealable polymeric material; at least one of the first, second and third films being a hot blown film having a layer of high molecular weight material.

In another aspect of the present invention, a method for making a thermoplastic laminate comprises extruding a first film comprising an abuse-resistant polymeric material; extruding a second film comprising an oxygen barrier polymeric material; extruding a third film comprising a heat sealable polymeric material; hot blowing at least one of the first, second, or third films to extrude the film; placing the second film between the first and third films; and bonding the films together to form a laminate.

BRIEF DESCRIPTION OF THE DRAWINGS

The invention is further illustrated by reference to the drawings wherein.

DESCRIPTION OF THE PREFERRED EMBODIMENTS

Figure 1:
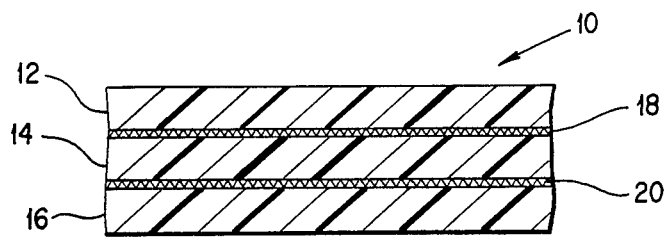
FIG. 1 is a cross sectional view of a three layered laminate in accordance with the present invention.

Referring to FIG. 1, a laminate 10 comprises a surface film 12, an intermediate barrier film 14, and a sealant film 16. These films are bonded together at interfaces 18 and 20, by for example lamination adhesive, corona discharge treatment, thermal bonding, or other suitable bonding processes well known in the art.

Each of films 12, 14, and 16 may be monolayer in construction, as illustrated in FIG. 1. Alternatively, one or more of these films may comprise a multi-layer structure.

Film 12 will comprise a material suitable for a surface layer of a laminate used in a forming process. Layer 12 should provide abuse resistance for the final package, and therefore will comprise a material having abuse-resistant properties, preferably polypropylene or ethylene propylene copolymer.

Intermediate film 14 includes an oxygen barrier material, preferably a high barrier such as ethylene-vinyl alcohol copolymer or vinylidene chloride copolymers, more preferably vinylidene chloride vinyl chloride copolymer or vinylidene chloride methylacrylate copolymer. The use of vinylidene chloride copolymers avoids the moisture sensitivity problem associated with EVOH, while permitting lower forming temperatures in a VSP process. For example, a typical process in which an EVOH containing web is utilized operates preferably in the range of 200° to 270° C. Utilizing vinylidene chloride copolymers, the dome temperature in a VSP process may range from about 145° to 200° C. As described above, there are several advantages associated with a lower temperature operation. At the same time, the beneficial effects of the saran material in providing high oxygen barrier characteristics under low as well as relatively high humidity conditions is obtained.

Sealant film 16 comprises a material such as a polyolefin, more preferably ethylene-vinyl acetate copolymer, which will provide a sufficient seal when used in a thermoforming or VSP process. This material must seal adequately to another web or a support structure to provide an integral leak proof package.

An important feature of the present invention is the use of a high molecular weight polymeric material, which has been hot blown to high blow ratio (4:1) and which is present in at least one of the component films. This material provides sufficient formability to allow the use of the laminate in a VSP or thermoforming process, and at the same time reduce wrinkles associated with such processes. A preferred blow up ratio for such materials is between about 3:1 and 5:1, and more preferably about 4:1. High molecular weight materials can be characterized by melt flow index, and more specifically by a fractional melt index, i.e. less than one (1) grams/10 minutes CASTM D-1238). The high molecular weight of the hot blow material helps to maintain material integrity during the blow up procedure. Polyolefin materials having a density less than about 0.935 g/cc are preferred. Thermoplastic materials with high molecular weight have the propensity to stretch sufficiently during the hot blown process to provide balanced orientation in both longitudinal (machine) and transverse directions. However, as mentioned previously, any of films 12, 14, and 16 maybe monolayer or multi-layer in construction. At least one of these films should contain a hot blow high molecular weight polymeric material, and preferably more than one or all of the component films of laminate 10 are made up of hot blown high molecular weight materials.

When only one of the component films of laminate 10 contains a high molecular weight polymeric material, and when this film has a coextruded multilayer construction, at least one of the layers of this film must comprise the high molecular weight material. Further, this film must be hot blown at a relatively high blow-up ratio, e.g. 4:1, to provide a thermoformable material exhibiting reduced line draw, or a VSP material exhibited reduced wrinkles. For example, referring to FIG. 2, surface film 32 comprises a surface layer 42 and an interior or bonding layer 44. Either or both of layers 42 and 44 may comprise the high molecular weight material. Of course, layer 42 should provide the abuse-resistance and other surface properties necessary for the contemplated end use.

When a monolayer film construction is used, the material comprising the film should have sufficient sealing properties that, when bonded to an adjacent component film of the laminate, by whatever bonding process is used, an adequate seal is produced which will not delaminate under normal processing and/or during the distribution cycle. For example, again referring to FIG. 2, bonding layer 44 of surface film 32 should provide sufficient bonding characteristics with relation to bonding layer 46 of intermediate barrier film 34, when treated with an appropriate bonding mechanism, to provide an integral final package that will not delaminate. Likewise, bonding layer 50 of intermediate barrier film 34 should, when treated, provide a sufficient bond to layer 52 of sealant film 36 (FIG. 2).

Figure 2:
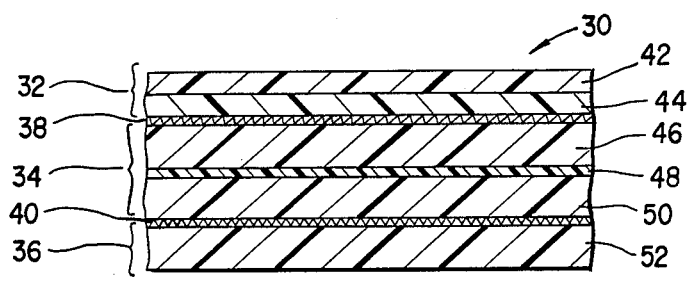
FIG. 2 is a cross sectional view of an alternate embodiment of the laminate.

It will be noted that a multi-layer barrier film is depicted in FIG. 2, comprising bonding layers 46 and 50, and an intermediate layer 48, typically very thin in gauge, which comprises the oxygen barrier film preferably such as EVOH or vinylidene chloride copolymer. Various blends, plasticizers, and other additives for enhancing processability may be added to the barrier resin prior to the extrusion of film 34.

In the case of a multi-layer film, coextrusion processes well known in the art may be utilized to produce these films. Coextension and extrusion coating are preferred techniques. A multi-layer construction for any of the component films may also be produced by conventional lamination techniques.

Figure 3:
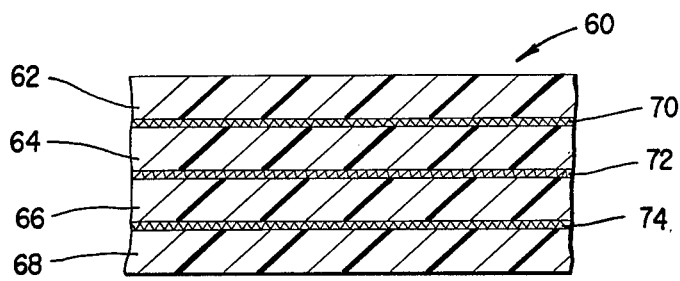
FIG. 3 is a cross sectional view of still another embodiment of the present invention.

Referring to FIG. 3, laminate 60 comprises a surface film 62, sealant film 68, and an intermediate barrier film 64. An additional filler film 66 is also included. Film 66 may provide a thicker laminate for end use applications where a stronger and/or tougher packaging material is required. Film 66 may also be used to advantage in providing an enhanced oxygen barrier characteristic to the total laminate, by including additional barrier materials. Polymeric resins may also be selected for film 66 which improve formability or other desired characteristics of the final packaging material.

As shown in FIG. 3, the various component films are bonded together by suitable bonding means at interfaces 70, 72, and 74 respectively.

In this manner, a laminate may comprise several component films which are bonded together to produce the desired laminate.

While the component films for the laminate of the present invention may be produced without an additional cross-linking step, it is preferred to cross-link at least one of the component films in order to broaden the temperature range at which the materials may be formed in a thermoforming or VSP process. Without cross-linking of at least one of the component films, the temperature window within which such processes may be operated may range from only a few degrees to about 10° C. With cross-linking, preferably by radiation, the practical temperature range within which such materials can be heated and properly formed is broadened considerably, by as much as 50° C. to 60° C.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

Chemical cross-linking agents may also be employed to provide the necessary cross-linking of at least one of the component films of the laminate. Such agents are typically added to a resin directly or by means of a master batch prior to extrusion of the blend.

Several surface films, barrier films, sealant films, and filler films were produced and combined to yield highly formable laminates in accordance with the invention.

For ease of reference, the following table describes the resins that were used.

TABLE 1

| | | |
|---|---|---|
| $EPC_1 =$ | FINA 8473 | (FINA) |
| $EVA_1 =$ | DU PONT 3508 | (DU PONT) |
| $EVA_2 =$ | EXXON 32.89 | (EXXON) |
| $EVA_3 =$ | ALATHON f-3445 | (DU PONT) |
| $EVA_4 =$ | ELVAX 3180 | (DU PONT) |
| $EVA_5 =$ | PE 204-CS95 | (EL PASO) |
| $EVA_6 =$ | LD-318.92 | (EXXON) |
| $LLDPE_1 =$ | DOWLEX 2045.03 | (DOW) |
| $LLDPE_2 =$ | DOWLEX 2035 | (DOW) |
| $SU_1 =$ | SURLYN A-1650 | (DU PONT) |
| $SU_2 =$ | SURLYN 1702 | (DU PONT) |
| $NYLON_1 =$ | CAPRON 8207 F | (ALLIED) |
| $S_1 =$ | SARAN | (DOW) |
| $LDPE_1 =$ | CHEMPLEX 3404 | (CHEMPLEX) |
| $PP_1 =$ | 8310 | (NORCHEM) |
| $EVOH_1 =$ | EVAL EC-F101 | (EVALCA) |
| $ADHESIVE_1 =$ | BYNEL CXA 3095 | (DU PONT) |
| $ADHESIVE_2 =$ | PLEXAR 3 | (CHEMPLEX) |

$EPC_1$ has an ethylene content of about 3.1%, and a melt index (M.I.) of about 4.6.
$EVA_1$ has a vinyl acetate content of about 12% by weight and a melt index of .3, i.e. a high molecular weight resin.
$EVA_2$ has a vinyl acetate content of about 4.5% by weight, and a 10 melt index, i.e. a low molecular weight resin.
$EVA_5$ has a vinyl acetate content of about 3.6% by weight, 2 M.I.
$EVA_6$ has a vinyl acetate content of about 9% by weight, 2 M.I.
$LLDPE_1$ has a 0.920 gms/cc density, 1.1 M.I.
$LLDPE_2$ has a 0.920 gms/cc density, 6.25 M.I.
$SU_1$ has a 1.6 melt index.
$SU_2$ has a 14 melt index.
$Nylon_1$ is a nylon 6.
$LDPE_1$ has a 1.8 M.I.

These regions were used in various combinations, as indicated in Tables 2, 3, 4, and 5 below, to produce blown sealant films, blown barrier films, blown surface films, and blown filler films respectively.

TABLE 2

Blown Sealant Films

| | |
|---|---|
| $B_1 =$ | $EVA_2/EVA_5/EVA_6/SU_1$ |
| $B_2 =$ | $EVA_2/EVA_1/SU_1$ |
| $B_3 =$ | $EVA_2/EVA_1/LLDPE_2$ |
| $B_4 =$ | $EVA_2/EVA_1/SU_2$ |
| $B_5 =$ | $EVA_2/EVA_1/EVA_1$ |
| $B_7 =$ | $EVA_2/EVA_1/EVA_4$ |
| $B_8 =$ | $EVA_2/PP_1/EVA_1/PP_1/EVA_2$ |
| $B_9 =$ | $EVA_2/LLDPE_1/EVA_3/EVA_1/SU_1$ |

TABLE 3

Blown Barrier Films

| | |
|---|---|
| $C_1 =$ | $EVA_2/LDPE_1/EVA_1/S_1/EVA_1/LDPE_1/EVA_2$ |
| $C_2 =$ | $EVA_2/EVA_1/S_1/EVA_1/EVA_2$ |
| $C_3 =$ | $EVA_2/EVA_1/ADHESIVE_1/EVOH_1/ADHESIVE_1/EVA_1/EVA_2$ |
| $C_4 =$ | $EVA_2/EVA_1/S_1/EPC_1/EVA_2$ |
| $C_5 =$ | $EVA_2/EVA_1/S_1/EVA_1/EVA_3/EVA_2$ |

TABLE 4

Blown Surface Films

| | |
|---|---|
| $D_1 =$ | $EPC_1/EVA_1/EVA_2$ |
| $D_2 =$ | $Nylon_1/Adhesive_2/EVA_1/EVA_2$ |
| $D_3 =$ | $EPC_1/EVA_1/EVA_2$ |
| $D_4 =$ | $LLDPE_1/EVA_3/LLDPE_1/EVA_2$ |

TABLE 5

Blown Filler Films

| | |
|---|---|
| $E_1 =$ | $EVA_2/LLDPE_1/EVA_2$ |
| $E_2 =$ | $EVA_2/EVA_1/EVA_2$ |
| $E_3 =$ | $EVA_2/LLDPE_1/EVA_3/LLDPE_1/LLDPE_1$ |
| $E_4 =$ | $EVA_2/EVA_1/EVA_4$ |
| $E_5 =$ | $LLDPE_1/EVA_3/LLDPE_1/EVA_2$ |

Each of the films in Tables 2 through 5 were coextruded by conventional techniques. Each had a final thickness of about 1 mil. $D_3$ had a final thickness of about 2 mils. In $B_8$, $EVA_2$ was blended with 10% mineral oil by weight of the layer, and $PP_1$ was blended with 2% by weight of the layer of mineral oil.

The invention may be further understood by reference to the examples below of laminates produced in accordance with the present invention. In each example, each film was subjected at its $EVA_2$ interface to corona discharge, and the barrier film were therefore bonded to adjacent films to form the laminate. In the case of Example 4, the $LLDPE_1$ surface layer of filler film $E_3$ was also corona bonded. In Examples 5 and 6, $EVA_4$ was corona treated to provide adhesion between films.

The laminate of Example 2 formed and sealed at approximately 123° C. and machined well, but had a relatively weak seal strength, possibly related to waxes in the material.

Examples 5 and 6 exhibited some voids in the film, and fractures in the saran layer.

The laminate of Example 7 formed and sealed at

| EXAMPLE | SEALANT FILM | FILLER FILM | BARRIER FILM | FILLER FILM | SURFACE FILM |
|---|---|---|---|---|---|
| 1 | $B_7$ | — | $C_4$ | — | $D_1$ |
| 2 | $B_7$ | — | $C_4$ | — | $D_1$ (9.M.R.) |
| 3 | $B_7$ (4.5 M.R.) | — | $C_4$ | — | $D_1$ (9.M.R.) |
| 4 | $B_7$ | $E_5$ (two films) | $C_5$ | — | $D_1$ |
| 5 | $B_7$ | $E_4$ (4.5 M.R.) | $C_4$ | — | $D_1$ (9.M.R.) |
| 6 | $B_7$ (4.5 M.R.) | $E_4$ | $C_4$ | — | $D_1$ (9.M.R.) |
| 7 | $B_8$ (9.M.R.) | — | $C_4$ | — | $D_1$ (9.M.R.) |
| 8 | $B_9$ | — | $C_5$ | $E_5$ (9.M.R.) | $D_1$ (9.M.R.) |
| 9 | $B_9$ | — | $C_5$ | — | $D_4$ |
| 10 | $B_9$ | — | $C_5$ | — | $D_4$ (9.M.R.) |
| 11 | $B_9$ (4.5 M.R.) | — | $C_5$ | — | $D_4$ (9.M.R.) |
| 12 | $B_9$ | — | $C_5$ (two films) | — | $D_4$ |
| 13 | $B_9$ | — | $C_5$ | — | $D_1$ |

The production of the surface film $D_1$ of Example 1 actually included the step of feeding five (5) streams of the $EVA_1$ from separate extruders because of the convenience of the configuration of the available equipment, but in fact the multiplicity of extruders utilized for extrusion of the intermediate $EVA_1$ material is not necessary, and a single extruder may be used to extrude a desired quantity and gauge of the intermediate material to produce a film. Likewise, the intermediate $EVA_1$ material of the barrier and sealant films of Example 1 were in fact produced from multiple extruders. Multiple extrusion of adjacent layers of identical resin was also done for some of the EVA and LLDPE resins of other examples.

With respect to Examples 1–8, very significant reductions in wrinkles were noted, compared with EVOH containing structures.

VSP films are typically heated prior to the packaging process, and about 40% of the heating capacity of the preheaters is normally used.

With the laminates of Examples 1–8, only about 20% to 30% of the preheat capacity was required.

In an actual VSP process, a preformed bottom web, such as PVC film or laminates of 8½ to 9 mils thickness, with a EVA sealant, carries the food product into the VSP unit.

The VSP web is then placed over the unit, and drawn up into a dome. This is accomplished by vacuumization at both the dome side and bottom of the unit. After heating to the proper sealant temperature, the VSP web is released by partial release of vacuum on the top, and then the vacuum is completely released at the top, while continuing vacuumization at the bottom web, to contact the VSP film to the preformed tray.

The laminate of Example 1, after being used in the process just decribed, provided a much improved wrinkle-free VSP package.

between 145° C. and 185° C.

With respect to irradiation, the same laminate as that of Examples 7, but without irradiation, sealed in a relatively narrow forming and sealing range of 123° C. to 125° C. It is therefore evident that irradiation (or other cross-linking) greatly broadens the sealing temperature range. For example, Example 2 and Example 3 had a very broad sealing range.

A peelable interface may be introduced into the laminate by the selection of appropriate materials. For example, in the first three examples, the interface between the ethylene-propylene copolymer and the saran is a peelable structure, requiring on the order of about 0.5 lbs. per linear inch to peel the laminate apart at this interface.

The bottom laminate of Example 4, preferably useful as a bottom web of about 6.5 mils thickness in conjunction with a VSP process, is less preferred in utilizing a peelable structure, but a peelable structure could be incorporated into either top or bottom web depending on the end use application.

This peelable feature is an option, and provides the ability to create a package in which a portion of the laminate may be removed in order to enhance or increase oxygen transmission properties for the benefit of the packaged article. Thus, the oxygen barrier material, in the present invention preferably saran or ethylene-vinyl alcohol copolymer, is stripped away to leave a non-barrier laminate on the package. It has been found that the non-barrier portion left after peeling, if less than about 1 mil, tends to be too thin to provide sufficient abuse-resistance and rigidity for most applications. A preferred thickness for the non-barrier portion is between about 1 and 4 mils, and preferably between about 2.5 and 3 mils.

Air bubbles may in some cases be entrapped in the region between films, creating an optically mottled appearance in the laminate. In peelable constructions, this can be overcome by having a peelable interface in the sealant film. When the barrier portion is stripped away, no film-to-film regions remain in the non-barrier portion.

It will be noted that both ethylene-vinyl alcohol copolymer and saran are used in connection with the present invention. To the degree that other materials provide oxygen barrier properties to the final laminate, e.g. polyamides such as nylon 6, these can be utilized in connection with the present invention.

If EVOH is utilized, the advantages of wrinkle reduction and high oxgyen barrier will be obtained, although the forming temperatures will typically be considerably higher than for saran formulations of the laminate. Also, barrier component films containing EVOH can be irradiated without the concern of whitening and degradation associated with the irradiation of saran.

If saran is the oxygen barrier material, lowered forming temperatures of about 145° to 205° C. (for VSP processes) can be utilized, compared with 200° C. to 270° C. for EVOH formulations. The saran, of course, also offers maintained barrier properties at relatively high humidities, compared with the relatively moisture sensitive EVOH.

Figure 4:
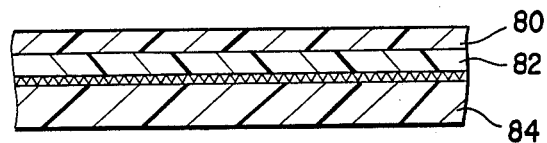
FIGS. 4 and 5 are cross-sectional views of additional alternate embodiments of the present invention.
Figure 5:
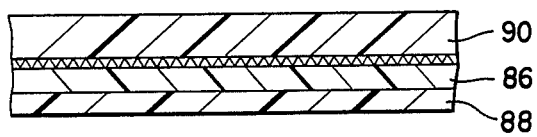

The above examples have been given by way of illustration only. It will be evident after review of the invention as described above, that other modifications may be made by one skilled in the art without departing from the scope of the present invention. For example, both monolayer and multilayer constructions, and additional filler layers can be incorporated into the laminate structure. Also, the function of the surface film, or sealant film, can be combined with the function of the barrier film in one film having a combination of properties. For example, as depicted in FIG. 4, one film may have an abuse-resistant surface layer 80 as well as a layer 82 having an oxygen barrier material. This film could then be adhered to a sealant film 84. Alternatively (FIG. 5), a film may have an oxygen barrier layer 86 with a sealant layer 88. This film would then be adhered to a surface film 90.

What is claimed is:

1. A thermoplastic laminate comprising:
   a) a first film, disposed as one surface of the laminate, comprising an abuse-resistant polymeric material;
   b) a second film comprising an oxygen barrier polymeric material;
   c) a third film, disposed as another surface of the laminate, comprising a heat sealable polymeric material; and
   d) at least one of said first, second, and third films being a hot blown film having a layer of high molecular weight material with a melt index of less than one gram/10 minutes at 190° C.

2. The laminate according to claim 1, wherein at least one of the first, second, and third films is hot blown at a blow-up ratio of between about 3:1 and 5:1.

3. The laminate according to claim 2, wherein at least one of the first, second, and third films is hot blown at a blow-up ratio of about 4:1.

4. The laminate according to claim 1, wherein at least one of the films is cross-linked.

5. The laminate according to claim 1, wherein the first film comprising a propylene polymer or copolymer.

6. The laminate according to claim 1, wherein the second film comprises an oxygen barrier polymeric material selected from the group consisting of vinylidene chloride copolymer and ethylenevinyl alcohol copolymer.

7. The laminate according to claim 1, wherein the third film comprises a polyolefin.

8. The laminate according to claim 7, wherein the third film comprises an ethylene polymer or copolymer.

9. The laminate according to claim 1, wherein an additional film, comprising a polyolefin, is disposed between the second film and one of the first and third films.

10. A thermoplastic laminate comprising:
    (a) a first multilayer film, disposed as one surface of the laminate, comprising a layer having an abuse-resistant polymeric material, and a layer having an oxygen barrier polymeric material;
    (b) a second film, disposed as another surface of the laminate, comprising a heat sealable polymeric material; and
    (c) at least one of said first and second films being a hot blown film having a layer of high molecular weight material with a melt index of less than one gram/10 minutes at 190° C.

11. A thermoplastic laminate comprising:
    (a) a first film, disposed as one surface of the laminate, comprising an abuse-resistant polymeric material;
    (b) a second multilayer film, disposed as another surface of the laminate, comprising a layer having an oxygen barrier polymeric material, and a layer having a heat sealable polymeric material; and
    (c) at least one of said first and second films being a hot blown film having a layer of high molecular weight material with a melt index of less than one gram/10 minutes at 190° C.

* * * * *